US008903188B2

(12) United States Patent
Gisquet et al.

(10) Patent No.: US 8,903,188 B2
(45) Date of Patent: Dec. 2, 2014

(54) METHOD AND DEVICE FOR PROCESSING COMPONENTS OF AN IMAGE FOR ENCODING OR DECODING

(71) Applicant: Canon Kabushiki Kaisha, Tokyo (JP)

(72) Inventors: Christophe Gisquet, Rennes (FR); Edouard Francois, Bourg des Comptes (FR)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/745,242

(22) Filed: Jan. 18, 2013

(65) Prior Publication Data

US 2013/0188883 A1    Jul. 25, 2013

(30) Foreign Application Priority Data

Jan. 19, 2012 (GB) .................................. 1200921.3

(51) Int. Cl.
*G06K 9/36*    (2006.01)
*G06K 9/46*    (2006.01)
*G06T 9/00*    (2006.01)

(52) U.S. Cl.
CPC ..................................... *G06T 9/004* (2013.01)
USPC .......................................... 382/238; 382/233

(58) Field of Classification Search
None
See application file for complete search history.

(56) References Cited

U.S. PATENT DOCUMENTS

| | | | |
|---|---|---|---|
| 7,916,958 B2* | 3/2011 | Witzgall et al. ................ | 382/238 |
| 2008/0170615 A1* | 7/2008 | Sekiguchi et al. ....... | 375/240.14 |
| 2009/0190659 A1* | 7/2009 | Lee et al. ................. | 375/240.12 |
| 2011/0255591 A1* | 10/2011 | Kim et al. ................ | 375/240.02 |
| 2013/0114706 A1* | 5/2013 | Gisquet et al. ........... | 375/240.12 |

FOREIGN PATENT DOCUMENTS

EP    2387242 A2    11/2011

* cited by examiner

*Primary Examiner* — Bhavesh Mehta
*Assistant Examiner* — Feng Niu
(74) *Attorney, Agent, or Firm* — Canon U.S.A., Inc. IP Division

(57) ABSTRACT

A method of processing components of an image for coding of an image portion of the image, the image being composed of a first component and a different second component. Samples of the second component are predictable from samples of the first component using a prediction model having a model parameter value. The method comprises:
  determining a plurality of subsets of samples usable for computing the model parameter value, wherein each subset of samples comprises samples of neighboring borders of the first component and the corresponding second component of the image portion, according to at least one predetermined sampling pattern and corresponding predetermined shifting offset,
  selecting, based on predetermined criteria, a subset of samples from among the plurality of subsets of samples; and
  predicting samples of the image portion using the prediction model and the model parameter value determined from the selected subset of samples.

36 Claims, 8 Drawing Sheets

METHOD AND DEVICE FOR PROCESSING COMPONENTS OF AN IMAGE FOR ENCODING OR DECODING

This application claims priority from GB patent application number 1200921.3 of Jan. 19, 2012, which is incorporated by reference herein it its entirety.

BACKGROUND OF THE INVENTION

The present invention concerns a method and device for processing components in an image. The invention further relates to a method and a device for encoding an image, and to a method and device for decoding an image.

At least one embodiment of the invention is applicable in the field of intra coding of chroma samples of video data.

Video data is typically composed of a series of still images or frames which are shown rapidly in succession as a video sequence to give the visual impression of a moving image. Video applications are continuously moving towards improved image resolution (greater number of pixels per frame, higher frame rate, higher bit-depth . . . ). A large quantity of video content is distributed in digital form via broadcast channels, digital networks and packaged media, with a continuous evolution towards improved quality and resolution (e.g. higher number of pixels per frame, higher frame rate, higher bit-depth or extended colour gamut). This evolution in technology puts increased pressure on distribution networks that already face difficulties in providing HDTV (high definition television) resolution and data rates economically to the end user. Consequently, further increases in data rate will put additional pressure on such distribution networks. To address this challenge, ITU-T (International Telecommunications Union, telecommunications Standardization Sector) and ISO/MPEG decided to launch a new video coding standard project in January 2010, known as High Efficiency Video Coding (HEVC). It will be appreciated that in what follows the term "HEVC" is used to represent the current implementation of HEVC, which is in course of standardization and will be subject to evolution.

HEVC codec design is similar to that of most previous so-called block-based hybrid transform codecs such as H.263, H.264, MPEG-1, MPEG-2, MPEG-4, SVC. Video compression algorithms, such as those standardized by the standardization bodies ITU, ISO and SMPTE, use spatial and temporal redundancies of images in order to generate data bit streams of reduced size. Spatial redundancy represents the mutual correlation between adjacent image pixels, while temporal redundancy represents the correlation between images of sequential images. Such compression processes make the transmission and/or storage of video sequences more effective.

According to HEVC an original video sequence comprises a succession of digital images which may be represented by one or more matrices the coefficients of which represent pixels. The images can be divided into slices where a slice can form part of the image or the entire image. In HEVC the slices are divided into non-overlapping Largest Coding Units (LCUs) which are generally blocks of size 64 pixels×64 pixels. Each LCU may in its turn be iteratively divided into smaller variable size Coding Units using a quadtree decomposition.

During video compression in HEVC, each block of an image being processed is predicted spatially by an "Intra" predictor (so-called "Intra" coding mode), or temporally by an "Inter" predictor (so-called "Inter" coding mode). Each predictor is a block of pixels obtained from the same image or another image, from which a difference block (or "residual") is derived. In the Intra coding mode the predictor (Intra predictor) used for the current block (prediction block) is a block of pixels constructed from the information already encoded of the current image.

In HEVC, the coding order of the blocks of an image follows a kind of zigzag pattern, as illustrated in FIGS. 2A and 2B: a Largest Coding Unit (or LCU) is a block of 64×64 pixels recursively split into smaller blocks (16×16), (8×8) down to 4×4 sized blocks. FIG. 2A illustrates the non-uniformity of the splitting (which is signaled in the bitstream). As a result of this coding order, the 4×4 blocks of an image are indexed according to the numbering illustrated in FIG. 2B. Note that in FIG. 2B, numbers above and on the left of the figure represent respectively the index of lines and columns of pixels.

More illustratively, the scanning seen on FIG. 2B can be read as:
1. Process 16×16 sized blocks of indexes 0, 16, 32 and 48 in that order; Note here that the index number of a 16×16 block is the index number of the 8×8 block located in the upper left corner of the 16×16 block;
2. Process 8×8 sized blocks of indexes 64, 80, 96 and 112 (again in that order);
3. Process 16×16 sized blocks of indexes 128, 144, 160 and 176;
4. Finally, process the remaining 32×32 sized block of index 192

For any N×N block spatial prediction methods can access 2N pixels (samples) on the top and left borders. Thus, for instance, the 16×16 block of index 0 would have access to pixels in columns 0 to 31 on its top border and in lines 0 to 31 on its left border (which may or may not exist if the block lies on the top and/or left outer borders of the image), and the 8×8 block of index 116 (whose first pixel coordinates is (56,16)) would access to line of pixels from pixel (56,15) to pixel (71,15) above and row from pixel (55,16) to pixel (55,31) on the left, effectively outreaching pixels not yet coded or even not existing.

To harmonize the prediction behavior, a coding method instead of directly accessing the image buffer can access a "prediction buffer", where missing pixels are replaced by previous existing ones. For example, in the case of the 8×8 block of index 116 in FIG. 2B, the values of missing above pixels from pixel (64,15) to pixel (71,15) are replaced by the value of above existing pixel (16,63), while values of missing left from pixel (55, 24) to pixel (55,31) are set to the value of left pixel (23,56).

It may also be noted that blocks that are last in the Z shape ordering always have their outer border entirely filled by the padding process (i.e. no actual border pixel data exists there). Those are:
For 4×4 blocks: indexes 3, 7, 11, 15, 19, 23 . . . (i.e. index modulo 3 equals 3);
For 8×8 blocks: 12, 28, 44, 60 (i.e. index/4 modulo 3 equals 3);
For 16×16 blocks: 48, 112, 176, 244 (i.e. index/16 modulo 3 equals 3).

An image of the video data to be transmitted may be provided as a set of two-dimensional arrays (also known as colour channels) of sample values, each entry of which represents the intensity of a colour component such as a measure of luma brightness and chroma colour deviations from neutral grayscale colour toward blue or red (YUV) or as a measure of red, green, or blue light component intensity (RGB).

A YUV model generally defines a colour space in terms of one luma (Y) and two chrominance (UV) components. Generally Y stands for the luma component (the brightness) and U and V are the chrominance (colour) or chroma components.

Among the various technologies in use in HEVC codec is the luma-based chroma prediction. Luma-based chroma prediction uses a linear model in a block to link luma components to chroma components. The parameters of the model may be determined on the fly, using samples located on the outer neighbouring borders of the block to be encoded and a least-mean square method.

The following model is given as example for generating an estimation of, i.e. predicting, the variable Y:

$$\hat{Y} = \sum_{i=1}^{N} a_i X_i \qquad (1)$$

where:
the $X_i$ values are input to the prediction model, for instance from other signals or previous values of the Y signal;
the $a_i$ factors, ranging from 1 to N, are parameters ("weights") for each input;
in the case for example where $X_0=1$, $a_0$ is a constant term In order to determine the model parameters, the quadratic error of the model for the Y signal over the pixels, indexed with n is expressed as:

$$e_C = \sum_n \left(Y_n - \sum_{i=1}^{N} a_i X_i\right)^2 \qquad (2)$$

The least mean square method tries to determine the $a_i$ parameters minimizing this error value. The possible minimum where all derivatives with respect to said parameters are null may be considered as:

$$\forall i, \frac{\partial e_C}{\partial a_i} = 0 \Rightarrow \sum_n X_i \left(Y_n - \sum_{i=1}^{N} a_i X_i\right) = 0 \qquad (3)$$

This can be rewritten as follows, showing that a classical system of N linear equations with N unknowns, to solve, is obtained:

$$\forall i, \sum_n a_i \sum_{k=1}^{N} X_{k,n} X_{i,n} = \sum_n X_{i,n} Y_n \qquad (4)$$

That can be expressed as a matrix system which is symmetrical, and on which known matrix solving algorithms such as the Gauss pivot can be used. The $a_i$ parameters may therefore be determined.

When coding a chroma block as intra (i.e. the chroma block depends on previously coded/decoded data from the current image), particular prediction modes can be applied, e.g. a directional bilinear prediction or a prediction by an average value. In all cases, samples the outer borders of the chroma block which may be referred to as a Coding Unit (hereafter CU), located inside of previously decoded CUs, are used. Those borders therefore contain decoded pixel data (samples), to which particular filtering might have been applied.

The prediction mode for predicting a chroma block in this example relies on an affine model:

$$C_{pred}[x,y]=\alpha \cdot L'[x,y]+\beta \qquad (5)$$

Here, the values of the prediction block made up of the pixels C[x,y] are linearly derived from the virtual luma values L'[x,y] which are in turn derived from the collocated decoded luma values.

The model parameters $\alpha$ and $\beta$ are found using samples of the outer borders of the chroma block and the outer borders of the co-located luma block and a Least Mean Square method as presented above.

With reference to FIG. 1, the model parameters $\alpha$ and $\beta$ are determined using encoded/decoded chroma samples on the top border 102 and left border 101 of the chroma block and co-located encoded/decoded luma samples from the top border 105 and left border 104 lying on the outside of the co-located luma block 106. The signals used as inputs are:

For the computation of the model parameters $\alpha$ and $\beta$:
L' values on left border 104 (x=−20) are obtained through filtering the decoded $Rec_L$ value located on the column immediately on the left with the vertical convolution filter 107, resulting in the output: where Rec refers to reconstructed $$Rec_L'[x,y]=(Rec_L[2x,2y]+Rec_L[2x,2y+1])>>1 \qquad (6)$$

Note that (>>x) represents an integer division by $2^x$.
L' values on top border 105 (y=−20) are filtered using the horizontal convolution filter 108, resulting in the output:

$$Rec_L'[x,y]=(Rec_L[2x-1,2y]+2Rec_L[2x,2y]+Rec_L[2x+1, 2y]+2)>>2 \qquad (7)$$

For the values 106 used in the prediction, the filter 107 described for the left border is reused but on a different column:

$$Rec_L'[x,y]=(Rec_L[2x,2y]+Rec_L[2x,2y+1])>>1 \qquad (8)$$

Note that in a classical YUV4:2:0 colour space, the nominal position of the chroma sample inside a 2×2 luma block is in the middle of the left luma column, corresponding to the 2x horizontal position in the above formulas.

For such a simple model, the solution can be easily expressed analytically as:

$$\alpha = \frac{N \sum_{i=1}^{N} C_i L_i' - \sum_{i=1}^{N} C_i \sum_{i=1}^{N} L_i'}{N \sum_{i=1}^{N} L_i'^2 - \left(\sum_{i=1}^{N} L_i'\right)^2} = \frac{N \cdot XY - X \cdot Y}{N \cdot XX - X \cdot X} = \frac{A_1}{A_2} \qquad (9)$$

with N being the number of input samples in the borders and the sums simplified as XY, X, Y and XX X corresponding to $$N \sum_{i=1}^{N} L_i'$$

and Y corresponding to $$N \sum_{i=1}^{N} C_i$$

XY corresponding to $$\sum_{i=1}^{N} C_i L'_i,$$

XX corresponding to $$\sum_{i=1}^{N} L'^2_i,$$

(notations that are used in what follows). Identically, we have for the constant parameter:

$$\beta = \frac{\sum_{i=1}^{N} C_i - \alpha \sum_{i=1}^{N} L'_i}{N} = \frac{Y - \alpha \cdot X}{N} \quad (10)$$

However, determining the model parameters is a complex task and adds complexity particularly in the case the decoder.

Although the use of multiple LM modes has been studied to improve coding efficiency, its use in some cases leads to increased complexity, since using N modes would multiply the most complex part of the encoder by N.

The present invention has been devised to address one or more of the foregoing concerns.

SUMMARY OF THE INVENTION

According to a first aspect of the invention there is provided a method of processing components of an image for coding of an image portion of the image, the image being composed of at least a first component and a second component different to the first component, wherein samples of the second component are predictable from samples of the first component using a prediction model linking the first component to the second component, the prediction model having at least one model parameter value representing the link between samples of the second component and corresponding samples of the first component; the method comprising: determining a plurality of subsets of samples, each subset of samples being usable for computing said at least one model parameter value, wherein each subset of samples comprises samples selected from samples of neighbouring borders of the first component and the corresponding second component of the image portion to be encoded, according to at least one predetermined sampling pattern and corresponding predetermined shifting offset for shifting the respective predetermined sampling pattern along the respective neighbouring border, selecting, based on predetermined criteria, a subset of samples from among the plurality of subsets of samples; and predicting samples of the image portion to be encoded using the prediction model and the at least one model parameter determined from the selected subset of samples.

Consequently the process for determining the model parameters is simplified leading to an improvement in coding efficiency.

at least one of the plurality of subsets of samples is adaptively determined in dependence upon the characteristics of the image portion to be encoded.

In an embodiment, the at least one predetermined sampling pattern and corresponding shifting offset for each subset of samples is from a determined set of sampling patterns and corresponding shifting offsets.

In an embodiment, the determined set of sampling patterns and shifting offsets is determined dependent upon the size and/or index of the image portion to be encoded.

In an embodiment, each subset of samples comprises samples from the top and left borders of the first component and samples on the top and left borders of the second component.

In an embodiment, each sampling pattern is defined by a respective sampling ratio defining the distance in terms of number of samples between selected samples on the respective border of the first component and the second component.

In an embodiment, each subset of samples contains a respective number of samples.

In an embodiment, the plurality of subsets of samples comprises a first subset of samples and a second subset of samples, wherein the first subset of samples is defined by a zero shifting offset for each border and a sampling ratio of 2 for each border.

In an embodiment, the second subset of samples has a shifting offset of 1 sample for each border and a sampling ratio of 2 for each border In an embodiment, the second subset of samples is defined in dependence upon the size of the image portion to be encoded and/or the index representative of the coding order of the image portion to be encoded.

In an embodiment, in the case where the image portion to be encoded has a size of 4×4 samples and the block index modulo 3 corresponds to 3, the shifting offset for each border is 1 sample and the sampling ratio is 2 samples, otherwise the shifting offset for each border is 4 samples and the sampling ratio is 2 samples In an embodiment, in the case where the image portion to be encoded has a size of N×M samples, the second subset of samples has a shifting offset of N samples for the top border and a shifting offset of M samples for the left border, and a sampling ratio of the left border corresponds to M/N multiplied by the sampling ratio of the top border the predetermined criteria comprises coding costs, each coding cost being determined for a respective subset of samples and being related to the prediction of samples of the first component from samples of the second component using said at least one model parameter determined from the respective subset of samples.

In an embodiment, each coding cost is determined based on distortion parameter determined from the image portion predicted according to the respective subset of samples In an embodiment, the coding cost is determined based on a parameter indicative of the quantity of data required to signal the respective subset of samples.

In an embodiment, the predetermined criteria comprises availability of the samples of the respective subset of samples for prediction.

In an embodiment, the method includes detecting, whether or not, at least one type of error exists in at least one such computed model parameter value of the prediction model for at least one subset of samples and in the case where at least a first type of error is detected;

adapting the at least one such computed model parameter value to correct the error detected; and predicting at least the second component from the first component using the prediction model and the adapted at least one model parameter value.

In an embodiment, the method includes determining whether at least one of a plurality of different types of error exists wherein adapting of the computed at least one model parameter value is dependent upon the type of error detected.

In an embodiment, detection of at least one type of error is performed for one subset of samples only.

In an embodiment, the detection of at least one type of error is performed for one subset of samples and the at least one model parameter associated with at least one other subset of samples is adapted in dependence upon the type of error detected for the said one subset of samples.

In an embodiment, the type of error detected may be at least one of a plurality of predetermined error types and wherein at least one predetermined adapting parameter value is associated with each predetermined type of error for adapting the computed at least one parameter value In an embodiment, the first component is a luma component and the second component is a chroma component In an embodiment, the prediction model is based on the expression:

$$C_{pred}[x,y] = \alpha \cdot L'[x,y] + \beta$$

where:

$C_{pred}[x,y]$ corresponds to a group of samples of the second component $L'_{pred}[x,y]$ corresponds to a group of corresponding samples obtained from samples of the first component $\alpha$ and $\beta$ are the model parameters of the prediction model A second aspect of the invention provides a method of processing components of an image for decoding of an image portion of the image, the image being composed of at least a first component and a second component different to the first component, wherein samples of the second component are predictable from samples of the first component using a prediction model linking the first component to the second component, the prediction model having at least one model parameter value representing, the link between samples of the first component and corresponding samples of the second component; the method comprising:

receiving sampling data indicative of a selected subset of samples from a plurality of subset of samples;

determining for the selected subset, samples to be used in determining the at least one model parameter;

determining the at least one model parameter based on the determined samples;

predicting samples of a second component of the image portion to be decoded from corresponding samples of the first component based on the determined at least one model parameter and the prediction model;

wherein the samples for the selected subset are selected from samples of neighbouring borders of the first component and the corresponding second component of the image portion to be decoded; according to at least one sampling pattern and corresponding shifting offset, shifting the respective sampling pattern along the neighbouring border, related to the received sampling data In an embodiment, the at least one predetermined sampling pattern and corresponding shifting offset for each subset of samples is from a determined set of sampling patterns and corresponding shifting offsets.

In an embodiment, the determined set of sampling patterns and shifting offsets is determined dependent upon the size and/or index of the image portion to be encoded.

In an embodiment, each subset of samples comprises samples from the top and left borders of the first component and samples on the top and left borders of the second component.

In an embodiment, each sampling pattern is defined by a respective sampling ratio defining the distance in terms of number of samples between selected samples on the respective border of the first component and the second component.

In an embodiment, the plurality of subsets of samples comprises a first subset of samples and a second subset of samples, wherein the first subset of samples is defined by a zero shifting offset for each border and a sampling ratio of 2 for each border.

In an embodiment, the second subset of samples has a shifting offset of 1 for each border and a sampling ratio of 2 for each border In an embodiment, the second subset of samples is defined in dependence upon on the size of the image portion to be decoded and/or the index representative of the coding order of the image portion to be decoded.

In an embodiment, in the case where the image portion to be decoded has a size of 4×4 samples and the block index modulo 3 corresponds to 3, the shifting offset for each border is 1 sample and the sampling ratio is 2 samples, otherwise the shifting offset for each border is 4 samples and the sampling ratio is 2 samples.

In an embodiment, in the case where the image portion to be decoded has a size of N×M samples, the second subset of samples has a shifting offset of N samples for the top border and a shifting offset of M for the left border, and a sampling ratio of the left border corresponds to M/N multiplied by the sampling ratio of the top border A third aspect of the invention provides a device for processing components of an image for coding of an image portion of the image, the image being composed of at least a first component and a second component different to the first component, wherein samples of the second component are predictable from samples of the first component using a prediction model linking the first component to the second component, the prediction model having at least one model parameter value representing the link between samples of the second component and corresponding samples of the first component; the device comprising:

means for determining a plurality of subsets of samples, each subset of samples being usable for computing said at least one model parameter value, wherein each subset of samples comprises samples selected from samples of neighbouring borders of the first component and the corresponding second component of the image portion to be encoded, according to at least one predetermined sampling pattern and corresponding predetermined shifting offset for shifting the respective predetermined sampling patterns along the respective neighbouring border, means for selecting, based on predetermined criteria, a subset of samples from among the plurality of subsets of samples; and means for predicting samples of the image portion to be encoded using the prediction model and the at least one model parameter determined from the selected subset of samples.

A fourth aspect of the invention provides a device for processing components of an image for decoding of an image portion of the image, the image being composed of at least a first component and a second component of a different type to the first component, wherein samples of the second component are predictable from samples of the first component using a prediction model linking the first component to the second component, the prediction model having at least one model parameter value representing, the link between samples of the first component and corresponding samples of the second component; the device comprising:

means for receiving sampling data indicative of a selected subset of samples from a plurality of subset of samples;

means for determining for the selected subset, samples to be used in determining the at least one model parameter;

means for determining the at least one model parameter based on the determined samples;

means for predicting samples of a second component of the image portion to be decoded from corresponding samples of the first component based on the determined at least one model parameter and the prediction model wherein the samples for the selected subset are selected from samples of neighbouring borders of the first component and the corresponding second component of the image portion to be decoded; according to at least one sampling pattern and corresponding shifting offset shifting the respective sampling pattern along the neighbouring border related to the received sampling data At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:—

DETAILED DESCRIPTION

Figure 3:
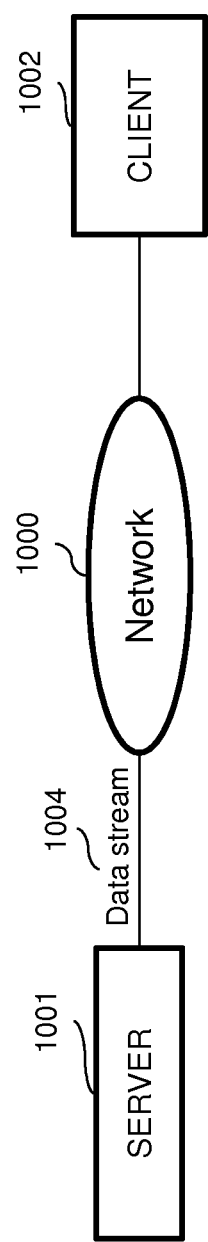
FIG. 3 is a schematic diagram of a data communication network in which one or more embodiments of the invention may be implemented.

FIG. 3 illustrates a data communication system in which one or more embodiments of the invention may be implemented. Although a streaming scenario is considered here, the data communication can be performed using for example a media storage device such as an optical disc. The data communication system comprises a transmission device, in this case a server 1001, which is operable to transmit data packets of a data stream to a receiving device, in this case a client terminal 1002, via a data communication network 1000. The data communication network 1000 may be a Wide Area Network (WAN) or a Local Area Network (LAN). Such a network may be for example a wireless network (Wifi/ 802.11a or b or g), an Ethernet network, an Internet network or a mixed network composed of several different networks. In a particular embodiment of the invention the data communication system may be a digital television broadcast system in which the server 1001 sends the same data content to multiple clients.

The data stream 1004 provided by the server 1001 may be composed of multimedia data representing video and audio data. Audio and video data streams may, in some embodiments of the invention, be captured by the server 1001 using a microphone and a camera respectively. In some embodiments data streams may be stored on the server 1001 or received by the server 1001 from another data provider, or generated at the server 1001. The server 1001 is provided with an encoder for encoding video and audio streams in particular f to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format.

The client 1002 receives the transmitted bitstream and decodes the reconstructed bitstream to reproduce video images on a display device and the audio data by a loud speaker.

In one or more embodiments of the invention an encoded video image is transmitted with a brightness component (lumina) and two colour components (chroma). The digital representation of the video signal thus includes a luma signal (Y), representative of brightness, and colour difference (or chroma) signals Cb (blue-Y) and Cr (red-Y).

It will be appreciated that while the detailed examples related to a YUV model the invention is not limited thereto, and may be applied to other models such as a RGB, or for encoding any image composed of several colour components, at least one colour component being considered as a reference colour component, the other colour components being dependently coded based on this reference colour component.

In at least one embodiment of the invention a luma-based chroma prediction mode in accordance with HEVC techniques may be applied to predict chroma samples from luma samples which have already been reconstructed. In the case of different resolutions of luma and chroma, an interpolation process is applied to luma samples to generate interpolated luma samples at the same resolution as the chroma samples to be predicted.

In the context of embodiments of the invention in which one or more blocks of chroma samples is predicted, the term 'inner' samples refers to the samples (luma or chroma) that are inside the corresponding luma or chroma block. The term 'outer' samples refers to the samples (luma or chroma) that are outside the corresponding luma or chroma block, and in particular to samples on borders neighbouring the luma or chroma block such as, the samples of the top line and left column neighboring the block.

When coding a chroma block as intra (i.e. the chroma block depends on previously coded/decoded (reconstructed) data from current image), particular prediction modes can be applied, e.g. a directional bilinear prediction or a prediction by an average value. In all cases, the outer borders of the chroma block, also referred to as a Coding Unit (hereafter CU), located inside of previously decoded CUs, are used. Those borders therefore contain decoded pixel data i.e. samples, to which particular filtering may have been applied.

The prediction mode for predicting chroma samples from filtered luma samples according to various embodiments of the invention relies on an affine model, as defined by expression (5), linking prediction chroma samples $C_{pred}[x,y]$ to previously coded and filtered luma samples $L'[x,y]$. Model parameters $\alpha$ and $\beta$ represent the link between the luma type samples and the chroma type samples.

A method of processing components of an image for coding of an image portion of the image according to an embodiment of the invention will now be described with reference to FIG. 4. The image being encoded is composed of a first type of component—luma and at least one second type of component—chroma. As mentioned above, chroma samples are predictable from luma samples using a prediction model defined by expression (5) linking luma components to corresponding chroma components. The prediction model has model parameters $\alpha$ and $\beta$ representing, the link between the luma component and the chroma component.

In a first step a list of potential subsets of samples used for determining the model parameters $\alpha$ and $\beta$ according to expressions (9) and (10), respectively is provided. The samples from which data is gathered to determine the model parameters are selected from the neighbouring top and left borders to the chroma block being encoded and the neighbouring top and left borders of its co-located luma block. Each subset of samples corresponds to a sampling pattern defining a sampling ratio and a shifting offset for shifting the respective pattern along the neighbouring border.

Given an N×M sized chroma block, for example, the shifting offset is defined as the distance in chroma samples between the sample at the start of the neighbouring border (or the index of the first sample) of the first component or the second component and the first sample of the respective border selected for the subset. The shifting offset should typically be less than or equal to the number of samples on the borders (respectively 2N and 2M on top and left borders). The sampling ratio is defined as the distance between each selected sample in a border and may be an integer or a non-integer value. Samples are selected from samples on the neighbouring top and left border of the co-located luma block according to the same sampling patterns for the corresponding borders of the chroma block.

Another parameter that may vary is the number of samples in each subset of samples. In a particular embodiment, the total number of samples each subset of samples is a power of 2. In the case of square blocks, in some embodiments, the same number of samples is selected from each border. The use of negative offsets may also be envisaged where appropriate.

Figure 5:
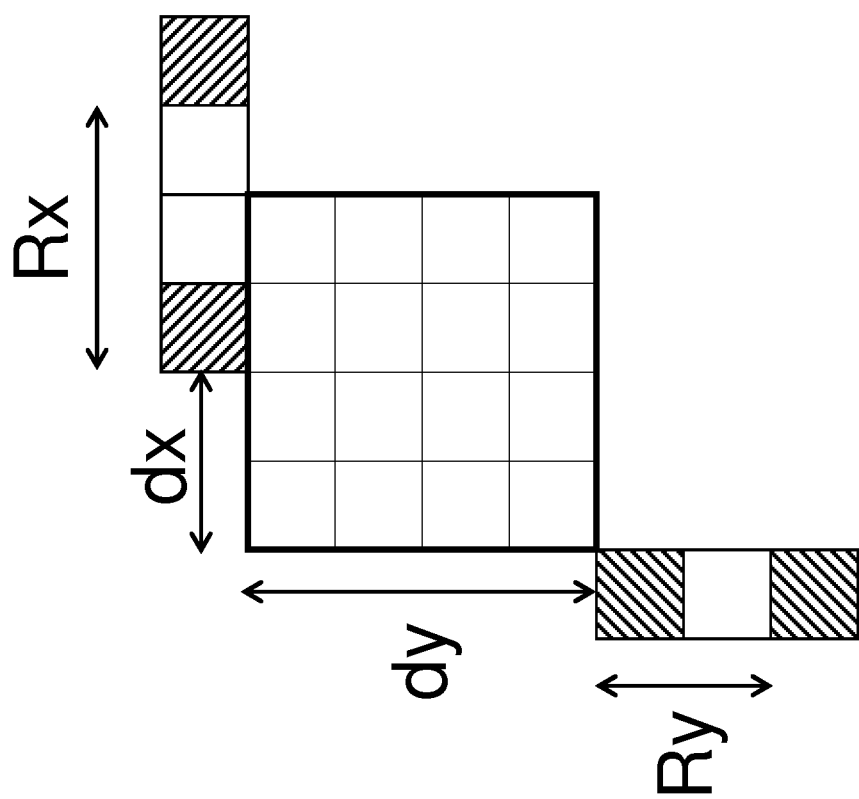
FIG. 5 schematically illustrates an example of sampling ratios and shifting offsets in accordance with an embodiment of the invention.

FIG. 5 illustrates an example of how sampling patterns and shifting ratios may be defined for a 4×4 chroma block. A respective shifting offset and a sampling ratio are defined for each border of the block—the top border and the left border 1. dx and dy represent the offsets in chroma samples for the top and left borders respectively. In this example offset dx is 2 and offset dy is 4;

2. Rx and Ry represent the sampling ratios for the top and left borders respectively; Rx has a value of 3 (ratio 1:3) and Ry has a value of 2 (ratio 1:2).

Regarding the sampling process, in some embodiments integer values are used for the sampling ratio and simple sample decimation: for a given value of Rx and dx, the samples used would be dx+0.Rx, dx+1.Rx, dx+2.Rx and so on. It will be appreciated that non-integer values may be used for Rx (involving interpolation of the $C_i$ and $L'_i$ signals on the borders), and/or filtering of the signal may be performed (e.g. using the 3 samples dx−1+n.Rx, dx+n.Rx and dx+1+n.Rx to generate the actual $C_i$ and L' signal values rather than just the value of sample at dx+n.Rx). It is also understood that this sampling can be merged with expressions (6) to (8), and that some more irregular sampling patterns could be used (e.g. for 1:2 ratio, pick the N/2 first samples).

It will be understood that numerous potential combinations of shifting offsets and sampling ratios may be used to define the subsets of samples. Consequently in some embodiments of the invention a predetermined set of sampling patterns and shifting offsets for potential subsets of samples is provided to reduce complexity.

Figure 6:
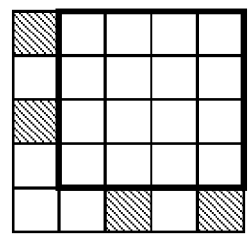
FIG. 6 schematically illustrates an example of sampling ratios and shifting offsets in accordance with an embodiment of the invention.
Figure 6:
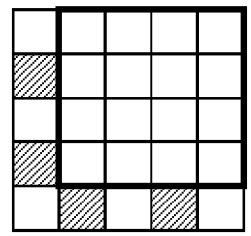
Figure 6:
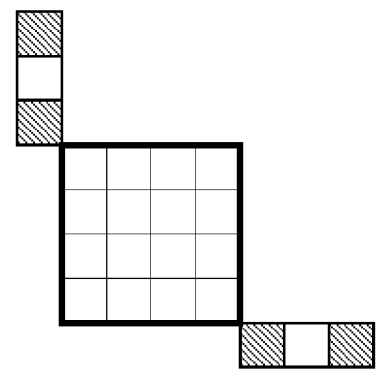

In a particular embodiment of the invention two luma based chroma prediction modes associated with respective sampling patterns and shifting offsets as illustrated in FIG. 6 are provided. A first prediction mode referred to as LM1 uses samples of the neighbouring top and left borders of the block having an even index (i.e. samples of index 0, 2, 4 . . . ). The sampling pattern for the subset of samples corresponding to mode LM1 is thus defined with shifting offsets dx and dy being equal to 0 and sampling ratios Rx and Ry being equal to 2; i.e. LM1: dx=dy=0 and Rx=Ry=2

A second prediction mode referred to as LM2 has two possibilities for determining the samples of the neighbouring borders to be used to determining the model parameters.

According to a first scenario (scenario 1), samples of the neighbouring top and left borders having an odd index are used i.e. 1, 3, 5 . . . . The sampling pattern for the subset of samples corresponding to mode LM1 is thus defined with shifting offsets dx and dy being equal to 1 and sampling ratios Rx and Ry being equal to 2; i.e. LM2: dx=dy=1 and Rx=Ry=2.

Scenario 1 for LM2 has the advantage that no padding process needs to occur, which leads to improved simplification.

Figure 1:
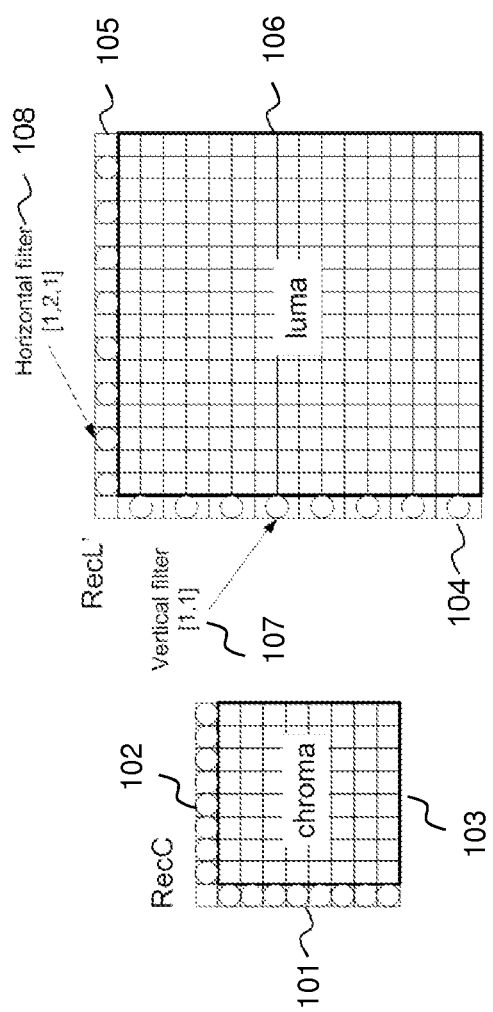
FIG. 1 schematically illustrates examples of sampling of luma samples and chroma samples for prediction of a chroma block which may be applied in the context of one or more embodiments of the invention.
Figures 2A, 2B:
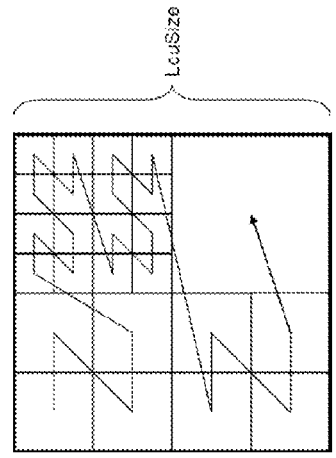
FIGS. 2A and 2B schematically illustrates an example of the processing order of blocks of an image.

A second scenario (scenario 2) relies on a HEVC padding process and block scan order as previously described with reference to FIGS. 2A and 2B; scenario 2 therefore uses samples of even index on the outer neighbouring top and left borders. In one particular embodiment of the invention a specific case is added, where, when the block order index indicates the last N×N block out of 4 in the block processing order, the sampling pattern of scenario 1 is used instead for that particular block. i.e. if N=4 and the block index modulo 3 equals 3 (or N=8 and block index modulo 3*4 equals 3*4 or N=16 and block index modulo 3*16 equals 3*16), dx=dy=1 and Rx=Ry=2. Otherwise, dx=N and dy=N, Rx=Ry=2

The number of chroma samples used on each border is the total number of chroma samples of the subset divided by 2. Extending the above mentioned scenarios to blocks sized N×M may be envisaged, for instance by having Ry=M/N*Rx, dx=N and dy=M.

In a particular embodiment of the invention, a predetermined list of sample subsets corresponding to the LM1 and LM2 sampling patterns and shifting offsets is provided in step 601. It will be appreciated however that, some samples in the neighbouring borders may be replicates of other samples in these borders. Thus, in some embodiments of the invention the list of possible sample subsets may be modified according to the block index and the size of the block being encoded, either by replacing, removing or reordering sample subsets in the list. In one particular embodiment, for example, it is detected as to whether the block is a N×N sized block that is last out of 4 in the processing order i.e if N=4 and the block index modulo 3 equals 3 (or N=8 and block index modulo 3*4 equals 3*4 or N=16 and block index modulo 3*16 equals 3*16), in order to determine whether to apply scenario 2 of LM2 sampling pattern and shifting offset or scenario 1 of LM2 sampling pattern and shifting offset. The list may thus be modified to include LM2 mode according to scenario 1 or 2 accordingly.

In step 602 evaluation of the list of sample subsets is initiated. Initially the first subset of samples defined by the first sampling pattern and shifting offset combination is selected for evaluation. An evaluation criterion value, referred to herein as coding cost, is initialized to its lowest value possible. In a preferred embodiment the coding cost corresponds to a Lagrangian cost associated with the use of the specific sampling pattern defining the subset of samples. The Lagrangian cost involves measuring:

a) a distortion parameter: once a given subset of samples has been selected for evaluation, a prediction is generated using the model parameters determined from the given subset of samples. The prediction generated is subtracted from the original pixels to provide a residual. Transform coding is then applied to the residual, resulting in coefficients that are quantized (the lossy part causing distortion between the original pixels and the reconstructed (predicted) pixels) and encoded in the bitstream b) a rate parameter: signalling of the given sampling pattern (for instance information indicative of LM1 or LM2, such as the coding mode in an embodiment or the sampling pattern) and the coded bitstream for quantized coefficients and any relevant information regarding their encoding Once the sample subset is selected from the list of predetermined sample subsets, parameters dx and Rx defining the given sampling pattern and shifting offset are used in step 603 to determine the samples to use from the first (e.g. top) border. In step 604 statistics are gathered from the determined samples of the first border for use in expressions (9) and (10) to determine model parameters α and β in step 607. Processing can then continue with samples of the second (e.g. left) border: in step 605, dy and Ry are used to determine the samples to select from this border for use in determining the model parameters. In step 606 the previously mentioned statistics are updated.

Once, all statistics have been gathered from the selected samples from the top and neighbouring borders, model parameters α and β for the current block and subset of samples are determined according to expressions (9) and (10) in step 607. In some embodiments the determined model parameters may then be adapted in subsequent step S607A as will be later described.

As described above for the determination of Lagrangian cost of the given subset of samples in step 609, coded information of the block may be generated in step 608: the model parameters α and β determined in step 607 (or adapted in step 607A where appropriate) are used in the prediction model of expression (5) to generate a prediction block, which is then subtracted from the original block to generate residuals. The residuals are transformed into transform coefficients, which are quantized and then encoded.

In step 609 the coding cost is computed for the given subset of samples. The computed coding cost is then used to select the best sampling pattern (subset of samples) in terms of coding costs so far evaluated in step 610. In terms of the Lagrangian cost, the best sampling pattern is the one minimizing that coding cost. If the current coding cost is not better than a previously evaluated coding cost, the process proceeds directly to step 612; otherwise intermediate step 611 occurs in which the current subset of samples being evaluated is stored as the best subset of samples before the process proceeds to step 612.

In addition to or as an alternative to a parameter indicative of the availability of the selected samples may be used to select a sunset of samples.

In step 612, it is determined if the end of the evaluation process has been reached by checking whether or not the current subset of samples was the last subset of patterns in the list to be evaluated. If such is the case, the process proceeds to step 613, otherwise the next subset of samples is selected in step 615 before looping the evaluation process back to step 603.

Step 613 then stores the best found subset of samples in terms of coding cost and relevant coded information determined in step 608. This ends the processing for the current block in step 614.

In step 607A it is determined whether or not at least one type of error exists in one or more of the model parameters α and β determined in step 607 In one such embodiment, the values of A1 and A2 of expression (9) are compared to thresholds, and the results of these comparisons yield an integer, related to the "error type". This "error type" as well as the chroma component index are in turn used to select a predetermined α parameter value to replace the α parameter value computed in step 607, and thereby also modifying the computed β parameter value of expression (10). For each "error type" and chroma component index, the corresponding predetermined value for model parameter α is determined at the encoder by finding the best from among a set of predetermined α values. The index of said best performer in said set is then transmitted in the bitstream, and the decoder can read all values for each possible combination of "error type" and chroma index to perform the same detecting and correcting process.

In some embodiments of the invention the detection of an error type in step 607A may be applied to one of the subsets of samples, for example for the subset of samples corresponding to mode LM1. In another example the detection of error type step 607A may be performed for each subset of samples (which will be referred to as 2LM from hereon) i.e. one α model parameter transmitted with the chroma index and LM mode index (either LM1 or LM2).

In one particular embodiment step 607A for detecting the presence of an error type may be performed for the subset of samples corresponding to LM1 and the value of model parameter α for mode LM2 may be determined from the value of model parameter α for mode LM1: i.e. for a given error type:

a. "$LM_+ + LM_-$": values for LM2 are the opposite ones of LM1

|     | U        | V        |
| --- | -------- | -------- |
| LM1 | $\alpha_U$  | $\alpha_V$  |
| LM2 | $-\alpha_U$ | $-\alpha_V$ | b. "LM$_+$+LM$_-$ V": for U, use same values and for V, opposite ones

|  | U | V |
|---|---|---|
| LM1 | $\alpha_U$ | $\alpha_V$ |
| LM2 | $\alpha_U$ | $-\alpha_V$ | c. "LM$_+$+LM$_-$ U": for V, use same values and for U, opposite ones

|  | U | V |
|---|---|---|
| LM1 | $\alpha_U$ | $\alpha_V$ |
| LM2 | $-\alpha_U$ | $\alpha_V$ |

Figure 7:
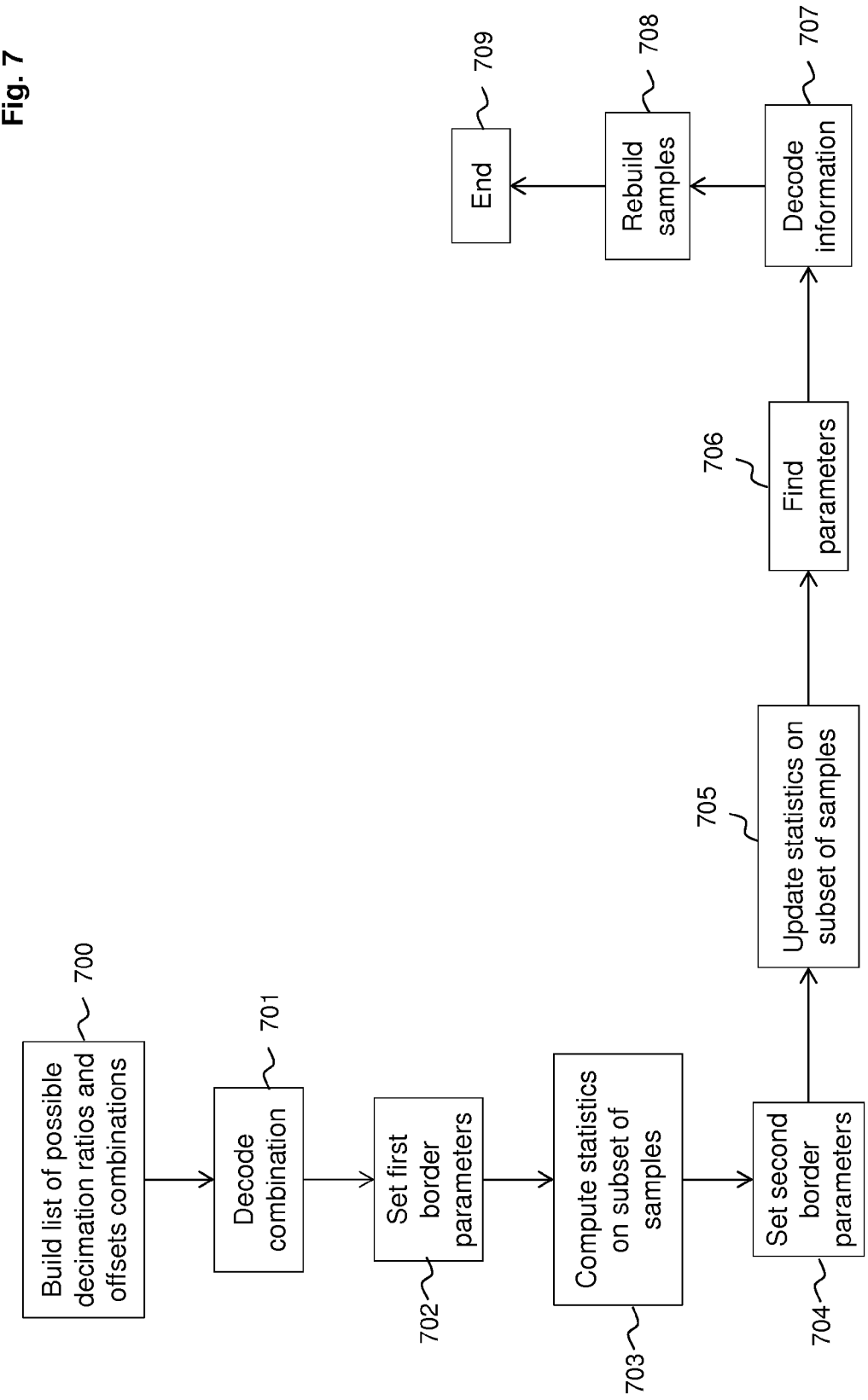
FIG. 7 is a flow chart illustrating steps of a method for decoding a block of an image in accordance with an embodiment of the invention.

In one particular embodiment scenario 2 for mode LM2 is applied and step 607A is performed for each LM mode LM1 and LM2. FIG. 7 illustrates the process, according to an embodiment of the invention performed by a decoder processing a bitstream generated by the encoding process of FIG. 4.

Figure 4:
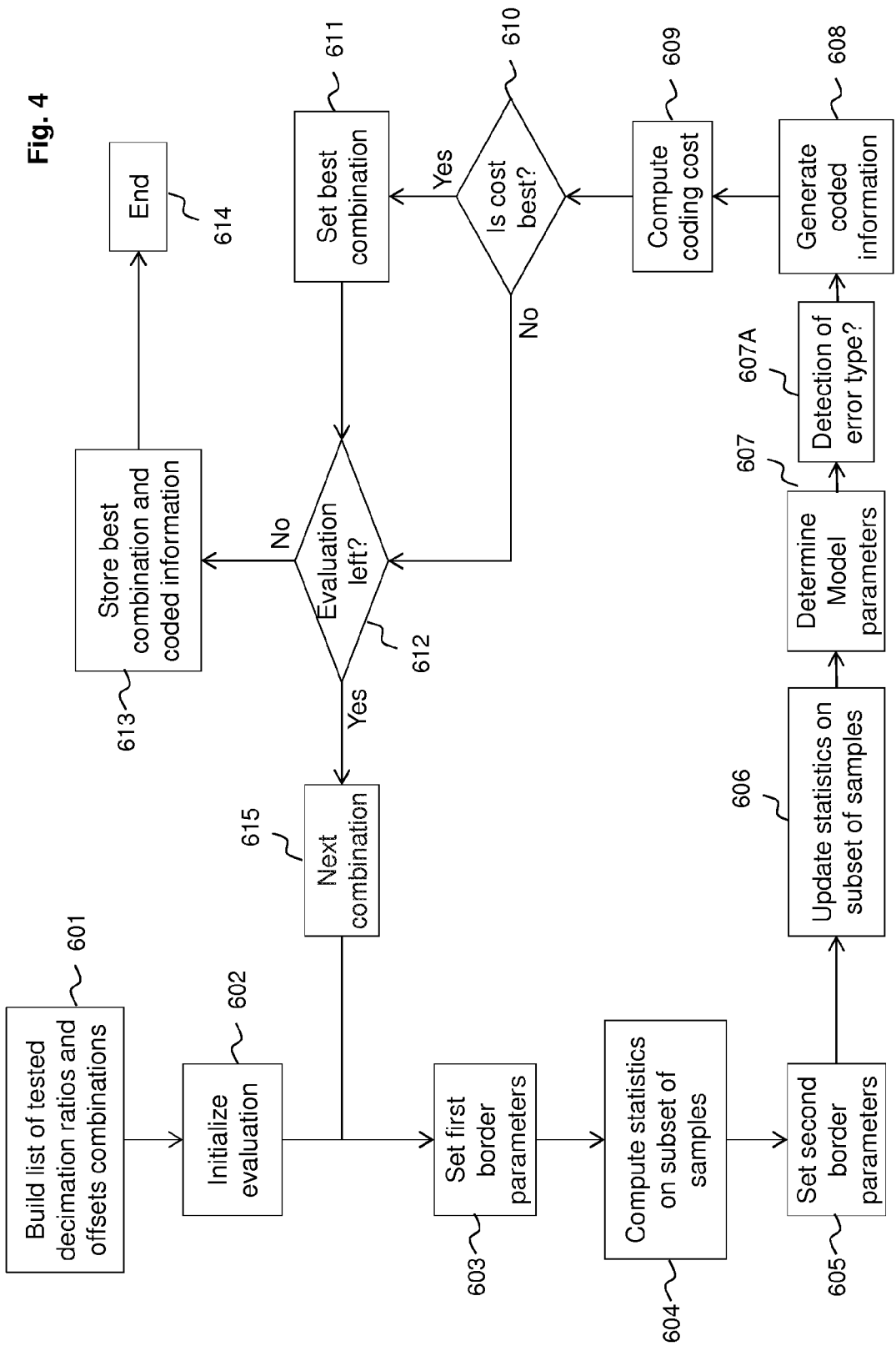
FIG. 4 is a flow chart illustrating steps of determining a sampling pattern and shifting offset for encoding of an image portion according to an embodiment of the invention.

In step 700 similar to step 601 of FIG. 4 a predetermined list of sample subsets corresponding to the LM1 and LM2 sampling patterns and corresponding shifting offsets is provided. Based on the predetermined list of sampling patterns and shifting offsets, the selected sampling pattern and shifting offset as signalled by the encoder may be determined in step 701, e.g. data indicative of the selected sampling pattern is extracted from the bitstream. Once the sampling pattern and shifting offsets is identified, sampling parameters dx, dy and Rx, Ry may be used to select samples from the top and left borders of the chroma block to be decoded for determining the model parameters for the prediction model of expression (5). In step 702 samples from the first (e.g. top) border are identified according to the sampling parameters and statistics are generated from the corresponding subset of samples in step 703. In step 704 samples are identified in the second border (e.g. left border) for determining the model parameters and statistics are updated in step 705. In step 706 the model parameters α and β are determined from the data gathered from the subset of samples. In step 707 a prediction block is generated from the prediction model using the determined model parameters. The bitstream information for the quantized coefficients is decoded in step 707, and using those quantized coefficients and the prediction generated using the previously determined model parameters, step 708 rebuilds the block being decoded. This ends the process for this block in step 709.

Figure 8:
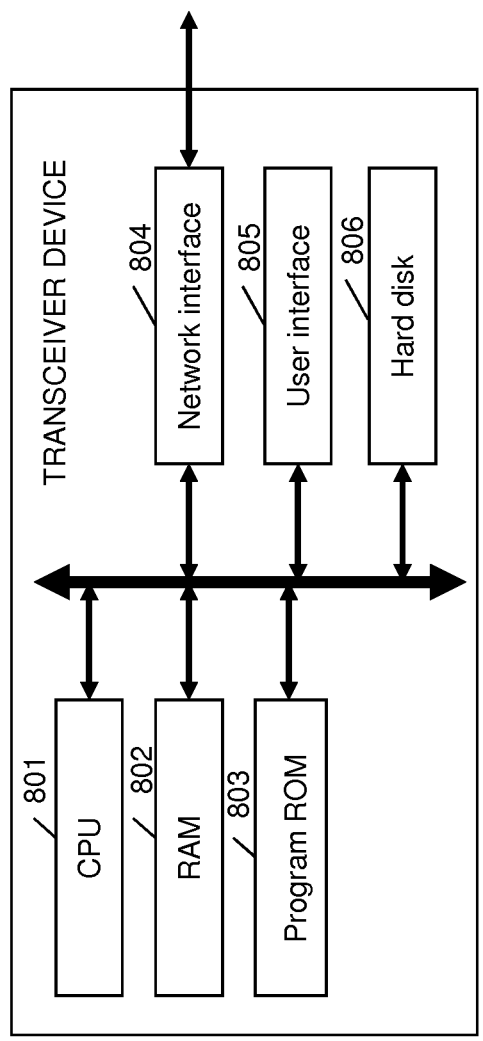
FIG. 8 is a block diagram of an encoding device or a decoding device in which embodiments of the invention may be implemented.

FIG. 8 illustrates a block diagram of a receiving device such as client terminal 1002 of FIG. 3 or transmitting device, such as server 1001 of FIG. 3 which may be adapted to implement embodiments of the invention. The method of FIG. 4 may be implemented in the device in the case of a transmitting device including an encoder, or the method of FIG. 7 may be implemented in the case where the device is a receiving device and comprises a decoder for decoding the image.

The device 800 comprises a central processing unit (CPU) 801 capable of executing instructions from program ROM 803 on powering up of the device 800, and instructions relating to a software application from a main memory 802 after powering up of the device 800. The main memory 802 may be for example of a Random Access Memory (RAM) type which functions as a working area of the CPU 801, and the memory capacity thereof can be expanded by an optional RAM connected to an expansion port (not illustrated). Instructions relating to the software application may be loaded into the main memory 802 from a hard-disc (HD) 806 or the program ROM 803 for example. Such a software application, when executed by the CPU 801, causes the steps of the method of embodiments of the invention to be performed on the device.

The device 800 further includes a network interface 804 enabling connection of the device 800 to the communication network. The software application when executed by the CPU is adapted to receive data streams through the network interface 804 from other devices connected to the communication network in the case of a receiving device and to transmit data streams through the network interface 804 in the case of a transmitting device.

The device 800 further comprises a user interface 805 to display information to, and/or receive inputs from a user.

Although the present invention has been described hereinabove with reference to specific embodiments, the present invention is not limited to the specific embodiments, and modifications will be apparent to a skilled person in the art which lie within the scope of the present invention.

For example although embodiments of the present invention have been described with reference to the prediction of chroma components from luma components, the invention may be applied to other type of image components.

Moreover, while the described embodiments relate to a HEVC scenario, the concept of the invention can be extended to:
  Non-block-based coding scheme, in which case the borders should be more broadly understood as samples in the neighborhood around the element being coded (e.g. sample)
  Other linear models, e.g. quadratic or predicting the V chroma component (e.g. of index 0) from Y and U (e.g. the chroma component of index 1)

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of processing components of an image for coding of an image portion of the image, the image being composed of at least a first component and a second component different to the first component, wherein samples of the second component are predictable from samples of the first component using a prediction model linking the first component to the second component, the prediction model having at least one model parameter value representing the link between samples of the second component and corresponding samples of the first component; the method comprising:
  determining a plurality of subsets of samples, each subset of samples being usable for computing said at least one model parameter value, wherein each subset of samples comprises samples selected from samples of neighbouring borders of the first component and the corresponding second component of the image portion to be encoded, according to at least one predetermined sampling pattern and corresponding predetermined shifting offset for shifting the respective predetermined sampling pattern along the respective neighbouring border;

selecting, based on predetermined criteria, a subset of samples from among the plurality of subsets of samples; and predicting samples of the image portion to be encoded using the prediction model and the at least one model parameter determined from the selected subset of samples.

2. The method according to claim 1, wherein at least one of the plurality of subsets of samples is adaptively determined in dependence upon the characteristics of the image portion to be encoded.

3. The method according to claim 1, wherein the at least one predetermined sampling pattern and corresponding shifting offset for each subset of samples is from a determined set of sampling patterns and corresponding shifting offsets.

4. The method according to claim 3, wherein the determined set of sampling patterns and shifting offsets is determined dependent upon the size and/or index of the image portion to be encoded.

5. The method according to claim 1, wherein each subset of samples comprises samples from the top and left borders of the first component and samples on the top and left borders of the second component.

6. The method according to claim 1 wherein each sampling pattern is defined by a respective sampling ratio defining the distance in terms of number of samples between selected samples on the respective border of the first component and the second component.

7. The method according to claim 1, wherein each subset of samples contains a respective number of samples.

8. The method according to claim 6, wherein the plurality of subsets of samples comprises a first subset of samples and a second subset of samples, wherein the first subset of samples is defined by a zero shifting offset for each border and a sampling ratio of 2 for each border.

9. The method according to claim 8, wherein the second subset of samples has a shifting offset of 1 sample for each border and a sampling ratio of 2 for each border.

10. The method according to claim 8, wherein the second subset of samples is defined in dependence upon the size of the image portion to be encoded and/or the index representative of the coding order of the image portion to be encoded.

11. The method according to claim 10, wherein in the case where the image portion to be encoded has a size of 4×4 samples and the block index modulo 3 corresponds to 3, the shifting offset for each border is 1 sample and the sampling ratio is 2 samples, otherwise the shifting offset for each border is 4 samples and the sampling ratio is 2 samples.

12. The method according to claim 10, wherein in the case where the image portion to be encoded has a size of N×M samples, the second subset of samples has a shifting offset of N samples for the top border and a shifting offset of M samples for the left border, and a sampling ratio of the left border corresponds to M/N multiplied by the sampling ratio of the top border.

13. The method according to claim 1, wherein the predetermined criteria comprises coding costs, each coding cost being determined for a respective subset of samples and being related to the prediction of samples of the first component from samples of the second component using said at least one model parameter determined from the respective subset of samples.

14. The method according to claim 13, wherein each coding cost is determined based on distortion parameter determined from the image portion predicted according to the respective subset of samples.

15. The method according to claim 13, wherein the coding cost is determined based on a parameter indicative of the quantity of data required to signal the respective subset of samples.

16. The method according to claim 15, wherein the detection of at least one type of error is performed for one subset of samples and the at least one model parameter associated with at least one other subset of samples is adapted in dependence upon the type of error detected for the said one subset of samples.

17. The method according to claim 1 wherein the predetermined criteria comprises availability of the samples of the respective subset of samples for prediction.

18. The method according to claim 1, further comprising:
detecting, whether or not, at least one type of error exists in at least one such computed model parameter value of the prediction model for at least one subset of samples and in the case where at least a first type of error is detected;
adapting the at least one such computed model parameter value to correct the error detected; and
predicting at least the second component from the first component using the prediction model and the adapted at least one model parameter value.

19. The method according to claim 18, further comprising determining whether at least one of a plurality of different types of error exists wherein adapting of the computed at least one model parameter value is dependent upon the type of error detected.

20. The method according to claim 18, wherein detection of at least one type of error is performed for one subset of samples only.

21. The method according to claim 18, wherein the type of error detected may be at least one of a plurality of predetermined error types and wherein at least one predetermined adapting parameter value is associated with each predetermined type of error for adapting the computed at least one parameter value.

22. The method according to claim 1, wherein the first component is a luma component and the second component is a chroma component.

23. The method according to claim 1, wherein the prediction model is based on the expression:

$$C_{pred}[x,y] = \alpha \cdot L'[x,y] + \beta$$

where:
$C_{pred}[x,y]$ corresponds to a group of samples of the second component,
$L'_{pred}[x,y]$ corresponds to a group of corresponding samples obtained from samples of the first component, and
$\alpha$ and $\beta$ are the model parameters of the prediction model.

24. A non-transitory computer-readable storage medium storing instructions of a computer program for implementing the method, according to claim 1.

25. The method of processing components of an image for decoding of an image portion of the image, the image being composed of at least a first component and a second component different to the first component, wherein samples of the second component are predictable from samples of the first component using a prediction model linking the first component to the second component, the prediction model having at least one model parameter value representing, the link between samples of the first component and corresponding samples of the second component; the method comprising:

receiving sampling data indicative of a selected subset of samples from a plurality of subset of samples;

determining for the selected subset, samples to be used in determining the at least one model parameter;

determining the at least one model parameter based on the determined samples; and predicting samples of a second component of the image portion to be decoded from corresponding samples of the first component based on the determined at least one model parameter and the prediction model, wherein the samples for the selected subset are selected from samples of neighbouring borders of the first component and the corresponding second component of the image portion to be decoded; according to at least one sampling pattern and corresponding shifting offset, shifting the respective sampling pattern along the neighbouring border, related to the received sampling data.

26. The method according to claim 25, wherein the at least one predetermined sampling pattern and corresponding shifting offset for each subset of samples is from a determined set of sampling patterns and corresponding shifting offsets.

27. The method according to claim 26, wherein the determined set of sampling patterns and shifting offsets is determined dependent upon the size and/or index of the image portion to be encoded.

28. The method according to claim 25, wherein each subset of samples comprises samples from the top and left borders of the first component and samples on the top and left borders of the second component.

29. The method according to claim 25, wherein each sampling pattern is defined by a respective sampling ratio defining the distance in terms of number of samples between selected samples on the respective border of the first component and the second component.

30. The method according to claim 29, wherein the plurality of subsets of samples comprises a first subset of samples and a second subset of samples, wherein the first subset of samples is defined by a zero shifting offset for each border and a sampling ratio of 2 for each border.

31. The method according to claim 30, wherein the second subset of samples has a shifting offset of 1 for each border and a sampling ratio of 2 for each border.

32. The method according to claim 30, wherein the second subset of samples is defined in dependence upon on the size of the image portion to be decoded and/or the index representative of the coding order of the image portion to be decoded.

33. The method according to claim 32, wherein in the case where the image portion to be decoded has a size of 4×4 samples and the block index modulo 3 corresponds to 3, the shifting offset for each border is 1 sample and the sampling ratio is 2 samples, otherwise the shifting offset for each border is 4 samples and the sampling ratio is 2 samples.

34. The method according to claim 32, wherein in the case where the image portion to be decoded has a size of N×M samples, the second subset of samples has a shifting offset of N samples for the top border and a shifting offset of M for the left border, and a sampling ratio of the left border corresponds to M/N multiplied by the sampling ratio of the top border.

35. A device for processing components of an image for coding of an image portion of the image, the image being composed of at least a first component and a second component different to the first component, wherein samples of the second component are predictable from samples of the first component using a prediction model linking the first component to the second component, the prediction model having at least one model parameter value representing the link between samples of the second component and corresponding samples of the first component; the device comprising:

a processor for determining a plurality of subsets of samples, each subset of samples being usable for computing said at least one model parameter value, wherein each subset of samples comprises samples selected from samples of neighbouring borders of the first component and the corresponding second component of the image portion to be encoded, according to at least one predetermined sampling pattern and corresponding predetermined shifting offset for shifting the respective predetermined sampling patterns along the respective neighbouring border;

a selector for selecting, based on predetermined criteria, a subset of samples from among the plurality of subsets of samples; and a sample predictor for predicting samples of the image portion to be encoded using the prediction model and the at least one model parameter determined from the selected subset of samples.

36. A device for processing components of an image for decoding of an image portion of the image, the image being composed of at least a first component and a second component of a different type to the first component, wherein samples of the second component are predictable from samples of the first component using a prediction model linking the first component to the second component, the prediction model having at least one model parameter value representing, the link between samples of the first component and corresponding samples of the second component; the device comprising:

a receiver for receiving sampling data indicative of a selected subset of samples from a plurality of subset of samples;

a sample processor for determining for the selected subset, samples to be used in determining the at least one model parameter;

a parameter processor for determining the at least one model parameter based on the determined samples; and a sample predictor for predicting samples of a second component of the image portion to be decoded from corresponding samples of the first component based on the determined at least one model parameter and the prediction model, wherein the samples for the selected subset are selected from samples of neighbouring borders of the first component and the corresponding second component of the image portion to be decoded; according to at least one sampling pattern and corresponding shifting offset shifting the respective sampling pattern along the neighbouring border related to the received sampling data.

* * * * *